(12) United States Patent
Berglund (10) Patent No.: US 8,590,632 B2
(45) Date of Patent: Nov. 26, 2013

(54) SINGLE PASS GROUND DRIVEN TILLER AND SEEDER APPARATUS

(75) Inventor: Brent P. Berglund, Brillion, WI (US)

(73) Assignee: Landoll Corporation, Marysville, KS (US)

( * ) Notice: Subject to any disclaimer, the term of this patent is extended or adjusted under 35 U.S.C. 154(b) by 163 days.

(21) Appl. No.: 13/022,287

(22) Filed: Feb. 7, 2011

(65) Prior Publication Data

US 2012/0199055 A1     Aug. 9, 2012

(51) Int. Cl.
*A01B 33/00*    (2006.01)

(52) U.S. Cl.
USPC ............... 172/49; 172/52; 172/77; 172/122

(58) Field of Classification Search
USPC ............ 111/194; 172/49, 52, 65, 69, 77, 108, 172/122
See application file for complete search history.

(56) References Cited

U.S. PATENT DOCUMENTS

|  |  |  |  |  |
|---|---|---|---|---|
| 93,959 | A |  | 8/1869 | Brown et al. |
| 381,464 | A | * | 4/1888 | Crane ............................ 172/69 |
| 466,771 | A | * | 1/1892 | Clark ............................ 172/520 |
| 492,255 | A |  | 2/1893 | Ashurst |
| 1,240,542 | A | * | 9/1917 | Cassell ........................... 172/49 |
| 1,397,428 | A | * | 11/1921 | Kerr ............................. 172/554 |
| 1,496,895 | A |  | 6/1924 | Kurtz |
| 1,807,182 | A | * | 5/1931 | Stoner ............................. 172/21 |
| 1,938,132 | A |  | 12/1933 | Broemmelsick et al. |
| 2,513,186 | A | * | 6/1950 | Leaman .......................... 172/49 |
| 2,948,345 | A | * | 8/1960 | Brewster ........................ 172/49 |
| 3,397,748 | A | * | 8/1968 | Whitesides .................... 172/548 |
| 3,414,064 | A |  | 12/1968 | Foster |
| 3,611,956 | A | * | 10/1971 | Moore et al. .................... 111/62 |
| 3,970,012 | A | * | 7/1976 | Jones, Sr. ....................... 111/118 |
| 4,102,404 | A |  | 7/1978 | Krammer |
| 4,105,077 | A |  | 8/1978 | Seifert |

(Continued)

FOREIGN PATENT DOCUMENTS

EP    0606834    7/1994

OTHER PUBLICATIONS

"Belco Greenscape Conservation Seeder", *Belco Resources Equipment Operator's Manual; Greenscape Conservation Seeder Model 600 & 840*, Manual from Feb. 10, 2010 National Farm Machinery Show in Louisville, KY.,(Feb. 10, 2010),1-60.

(Continued)

*Primary Examiner* — Jamie L McGowan
(74) *Attorney, Agent, or Firm* — Law Office of Mark Brown, LLC; Mark E. Brown (57) ABSTRACT

A single pass ground driven tiller and seeder apparatus includes a support frame, an elongated drive rotor journaled transversely on the frame, a tillage assembly pivotally connected to the frame and formed by a pair of rearwardly extending bearing plates and having an elongated tillage rotor journaled thereto and extending transversely therebetween, and a firming roller journaled between mounting plates pivotally connected to the bearing plates. The drive rotor is rotated by ground contact as the apparatus is drawn along by a tractor. The drive rotor is drivingly engaged with the tillage rotor so that the tillage rotor rotates at a faster speed than the drive rotor. A seed metering mechanism is supported on the frame and deposits seed in front of the drive rotor. The tillage rotor breaks the soil and incorporates the seed into the soil, after which the firming roller firms the seed bed.

21 Claims, 11 Drawing Sheets

(56) References Cited

U.S. PATENT DOCUMENTS

| | | | |
|---|---|---|---|
| 4,136,744 A | | 1/1979 | Hammett et al. |
| 4,178,009 A | | 12/1979 | Worick |
| 4,232,747 A | | 11/1980 | Pfenninger et al. |
| 4,492,273 A | * | 1/1985 | Fox .............................. 172/520 |
| 4,721,167 A | | 1/1988 | Salley et al. |
| 4,750,440 A | * | 6/1988 | Pollard et al. ................. 111/151 |
| 4,790,389 A | | 12/1988 | Adee et al. |
| 4,817,729 A | | 4/1989 | McCormick |
| 6,325,155 B2 | | 12/2001 | Friggstad |
| 6,467,550 B1 | * | 10/2002 | Firdaus .......................... 172/68 |
| 6,926,092 B2 | * | 8/2005 | Firdaus .......................... 172/71 |
| 8,162,071 B2 | * | 4/2012 | Barger ............................ 172/21 |

OTHER PUBLICATIONS

"Take Your Seeding Performance to the Next Level! All-New Frontier CS13 Series Conservation Seeders", *John Deere Frontier CS13 Series Conservation Seeders*, Brochure from Feb. 10, 2010 National Farm Machinery Show in Louisville, KY,(Feb. 10, 2010),1-2.

"BLEC Global Ltd Multiseeder", http://www.blecglobal.com/turfcareequipment/multiseeder/; Retrieved from internet May 11, 2011, From Feb. 10, 2010 National Farm Machinery Show in Louisville, KY,(Feb. 10, 2010),1-1.

"Frontier TR10 Series Overseeders", http:/salesmanual.deere.com/sales/salesmanual/en_NA/frontier/2011/feature/turf_care-too . . . Retrieved from internet May 12, 2011, John Deere updated manual/brochure which was first discovered at National Farm Machinery Show in Louisville, KY on Feb. 10, 2010—This is an updated version,(Aug. 10, 2010),1-4.

"Reist Aeraseeder", 6' & 8' *Aeraseeder; The Reist Aerator and Overseeder; Reist Industries*, Elmira, Ontario, Canada; *Reist Industries USA* 844 E. Greenwood Street, Abbeville, SC 29620; www.reistindustries.com, Manual from Feb. 10, 2010 National Farm Machinery Show in Louisville, KY, (Feb. 10, 2010),1-2.

"LandPride All-Purpose Seeders", *APS15 Series*; Retrieved from internet on May 12, 2011; http://www.landpride.com/products/prod_ps/prod_aps.html, National Farm Machinery Show in Louisville, KY, Feb. 10, 2010,(Jan. 27, 2009),1-3.

"Woods STR Series Turf Renovators", *Woods Equipment Company*; http://www.woodsequipment.com/landscapeequipmentdetail.aspx?id=10285; Retrieved from internet May 11, 2011, National Farm Machinery Show in Louisville, KY, Feb. 10, 2010,1-1.

"M&W Dyna-Drive Models 4000, 5000, and 6000", *Dyna-Drive: Tillage For Today, Tomorrow, and the Future 2009 Alamo Group Inc.* 1020 South Sangamon, Gibson City, IL 60936 www.mw-gear.com, National Farm Machinery Show in Louisville, KY, Feb. 10, 2010,(Jan. 1, 2009),1-4.

* cited by examiner

SINGLE PASS GROUND DRIVEN TILLER AND SEEDER APPARATUS

BACKGROUND OF THE INVENTION

1. Field of the Invention

The present invention relates generally to agricultural equipment and, more particularly, to a single pass, ground driven tiller and seeder apparatus.

2. Description of the Related Art

The maintenance of athletic fields such as football, baseball, and soccer fields, golf courses, and the like sometimes requires the replanting of grass. Such maintenance is also periodically necessary for lawns, parks, institutional grounds, and pastures. Additionally, the production of hay and sod requires grass planting on a large scale. Where large fields need to be planted or replanted, a mechanized approach is appropriate. Although it is possible to simply spread grass seeds onto existing fields, more effective germination of the seeds results from dethatching any existing vegetation, breaking up the surface of the ground, and incorporating the seeds into the soil. Seeding implements often include a support frame carried or towed by a tractor, a seed storage and metering mechanism mounted on the frame, tillage tools to break up the soil to receive the seeds, and additional tools to close the broken soil over the deposited seeds.

SUMMARY OF THE INVENTION

An embodiment of the present invention provides a tractor mounted, ground driven, minimum till seeder apparatus designed to plant a variety of seeds into previously untilled or lightly tilled soil which is relatively firm, in a single pass. The invention is applicable to primary seeding and overseeding of pastures, parks, lawns, athletic fields, roadsides, and wildlife food plots. In general, the apparatus includes a ground contact drive rotor followed by a tillage rotor and a firming roller. In an embodiment of the invention, seed is dropped onto the ground in front of the drive rotor by a seed metering mechanism and is incorporated into soil which is loosened and broken up by the tillage rotor. The firming roller provides additional break-up of the soil and lightly compresses the soil over the seeds to provide optimal contact of the soil with the seeds.

An embodiment of the tiller and seeder apparatus includes a support frame formed by one or more transverse beams from which extend sidewalls. The support frame may include a hinged platform extending from sidewall to sidewall which closes the top of the support frame. The support frame supports components of a conventional three-point hitch assembly for connection of the apparatus to a three-point hitch of a tractor. The support frame also supports a seeding assembly including one or more seedboxes storing a quantity of seed to be planted and a seed metering mechanism which dispenses the seed from the seedboxes at a controlled rate.

An embodiment of the drive rotor is formed by an elongated drive rotor shaft having a plurality of toothed drive rotor plates secured therealong in axially spaced relation. The drive rotor is journaled in the side walls of the support frame in drive rotor bearing blocks. The drive rotor is positioned on the support frame so that the drive rotor teeth are exposed for contact with the ground during operation. The drive rotor is rotated by contact with the ground as the apparatus is drawn forward by the tractor. A pair of bearing plates are pivotally mounted and retained on stubs of the drive rotor shaft extending past the drive rotor bearing blocks on opposite sides of the support frame.

An embodiment of the tillage rotor is formed by an elongated tillage rotor shaft having a plurality of toothed tillage rotor plates secured along the tillage rotor shaft in axially spaced relation. The spacing of the tillage rotor plates is the same as the spacing of the drive rotor plates; however, the sets of plates are staggered such that the tillage rotor plates are centered between adjacent drive rotor plates. Ends of the tillage rotor shaft are journaled in tillage rotor bearing blocks positioned in spaced relation to the driver rotor bearing blocks at the rear ends of the bearing plates. The tillage rotor and bearing plates form a tillage assembly which is pivotally connected to the support frame. In an embodiment of the invention, the drive and tillage rotor shafts are spaced so that the sets of drive and tillage rotor plates are enmeshed. Meshing of the rotor plates of the drive and tillage rotors provides a self-cleaning mechanism which prevents grasses and roots from clogging the rotors. A drive mechanism is engaged between the drive and tillage rotor shafts and may include elements such as a roller chain and sprockets to rotate the tillage rotor at a selected rate as the drive rotor is rotated.

It is important to maintain the drive rotor and the tillage rotor in parallel relation to prevent engagement of the toothed rotor plates of the rotors and damage thereto and also to the chain drive. An embodiment of the apparatus is provided with a rockshaft which is pivotally mounted on apparatus frame and which extends from side wall to side wall. A bell crank is secured to each end of the rockshaft. One arm of each crank is connected by a rockshaft link to the respective bearing plate. Opposite arms of the cranks may be provided with a curved slot which engages a pin extending from the adjacent side wall, which functions as a clamp to stabilize the apparatus when disconnecting it from a tractor and may also function to limit the arc of travel of the tillage rotor relative to the axis of the drive rotor. Alternatively, the arms of the cranks may be connected to damper or shock absorber units pivotally connected to the side walls of the frame to reduce tendencies of the tillage rotor to bounce or oscillate due to interaction with the ground contact. In an embodiment, at least one of the crank arms is connected through an adjustable air shock unit. Variable downward pressure can be applied to the tillage rotor by adjusting the air pressure in the air shock. Alternatively, a coil-over shock absorber can be used instead of the air shock which uses a coil spring rather than air pressure to produce the downward force on the tillage rotor.

It is desirable to control the tillage depth of the tillage rotor, depending on the type and condition of the soil, the type of seed to be planted, and other factors. To some extent, the depth of tillage is controlled by the amount of downward pressure which is applied to the tillage rotor. Additionally, the bearing plates can be provided with gauge wheels which ride on the ground surface and limit the penetration of the tillage rotor teeth. Preferably, the vertical positions of the gauge wheels can be adjusted.

It is important to maintain lateral alignment of the tillage rotor relative to the drive rotor, again to prevent damaging engagement of the toothed plates of the rotors and the chain drive. In an embodiment of the apparatus, adjustable thrust bearings are engaged between the bearing plates and the side walls of the support frame. The bearing plates may also be provided with stop blocks which engage stop slots formed in the side walls of the support frame to limit the arc of movement of the tillage rotor relative to the support frame.

The firming roller is mounted in roller mount plates which are pivotally connected to rear ends of the bearing plates. The firming roller is allowed to float over the ground contours without remaining parallel to the drive and tillage rotors. However, movement of the firming roller is controlled by telescoping links between each of the roller mount plates and the side walls of the support frame and by roller stops on inner sides of the bearing plates. The firming roller is rolled over the soil broken by the tillage rotor to break up soil clods and to firm the seedbed.

Various objects and advantages of the present invention will become apparent from the following description taken in conjunction with the accompanying drawings wherein are set forth, by way of illustration and example, certain embodiments of this invention.

The drawings constitute a part of this specification, include exemplary embodiments of the present invention, and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 1 generally designates an embodiment of a single pass ground driven tiller and seeder apparatus according to the present invention. Referring to FIGS. 1-5, the apparatus 1 generally includes a lower tillage unit 2 and an upper seed metering unit 3. The tillage unit 2 supports the seed metering unit 3 and prepares the ground to receive seeds dispensed by the seed metering unit 3 and closes the ground thereafter. The seed metering unit 3 stores a quantity of seeds and dispenses the seeds at a controlled rate for incorporation into the soil by the tillage unit 2.

The illustrated tillage unit 2 generally includes a support frame 7 on which a drive rotor 10 is rotatably mounted and on a drive rotor journal of which is pivotally mounted a tillage assembly 12 including a tillage rotor 15 and a firming roller 18. The tillage rotor 15 is drivingly engaged with the drive rotor 10 to rotate, preferably, at a faster rate than the drive rotor 10. The apparatus 1 is drawn along the ground by a tractor (not shown). Seeds are dispensed in front of the drive rotor 10 by the seed metering unit 3. The drive rotor 10 is rotated by ground contact as the apparatus 1 is drawn forward by a tractor. Rotation of the drive rotor 10 causes rotation of the tillage rotor 15 which opens the ground and incorporates the seed into the soil. The seed bed, thus formed, is firmed by the firming roller 18.

Referring to FIGS. 6-9, the illustrated support frame 7 is formed of one or more cross or transverse members 22 which may be in the form of square tubular beams. The frame 7 may include longitudinal or front-to-back members (not shown) to form a rectangular frame. A top platform 24 extends across an upper side of the frame 7, while side walls 26 depend from the lateral ends of the frame 7. The platform 24 and side walls 26 may be formed of rigid plate stock. The illustrated front transverse member 22 has components 28 of a three point hitch assembly secured thereto for hitching the apparatus 1 to companion components of a tractor. The frame 7 supports the drive rotor 10, the tillage assembly 12, and the seed metering unit 3.

Figure 8:
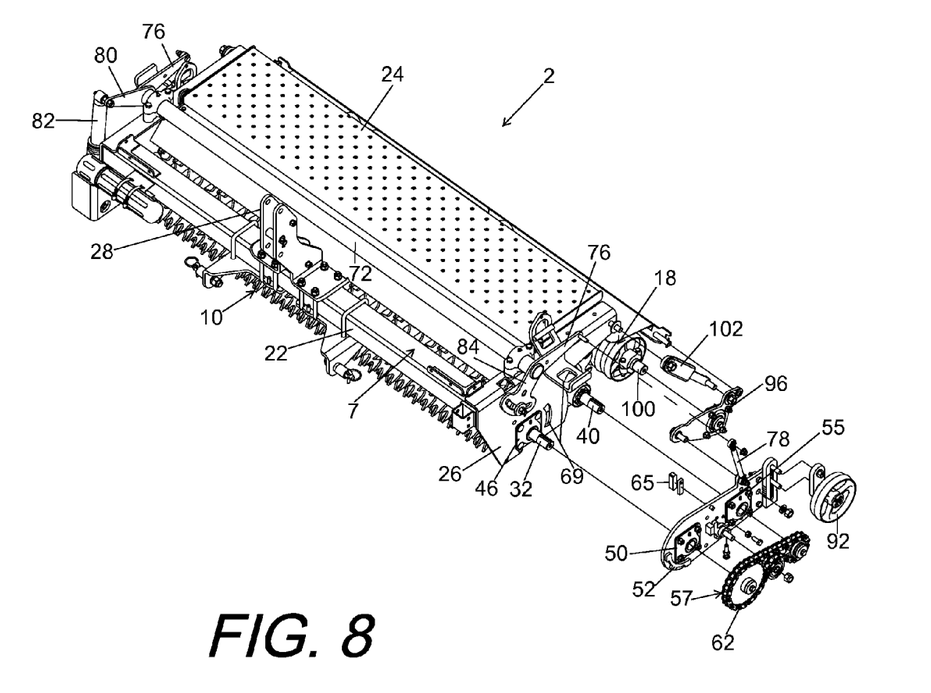
FIG. 8 is an exploded perspective view of the tillage unit from a left front position and illustrates details of a bearing plate and chain drive of the apparatus.
Figure 9A:
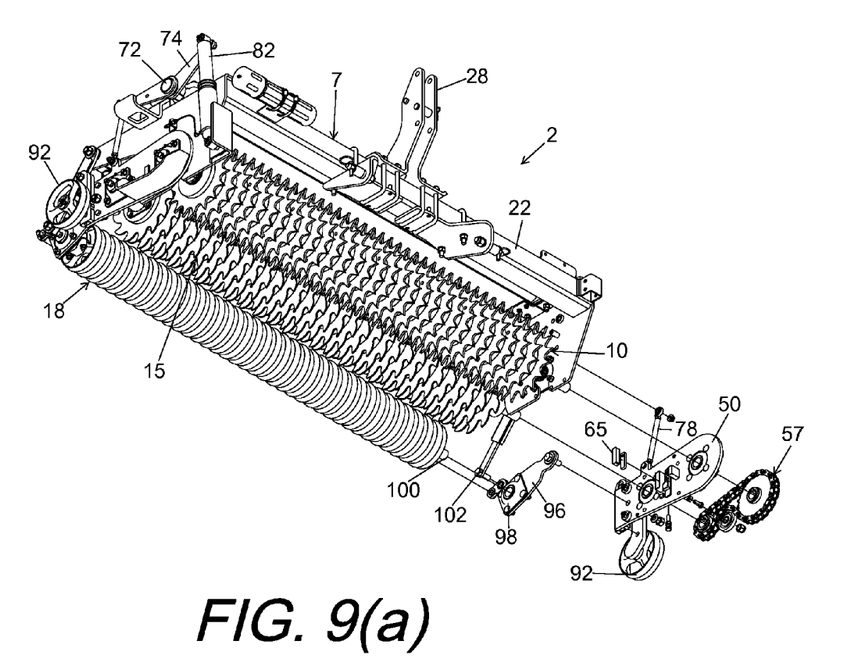
FIGS. 9(a) and 9(b) are exploded perspective views of the left end of the tillage unit from beneath the unit, with FIG. 9(b) being enlarged to better illustrate details of the bearing plate and chain drive of the apparatus.
Figure 9B:
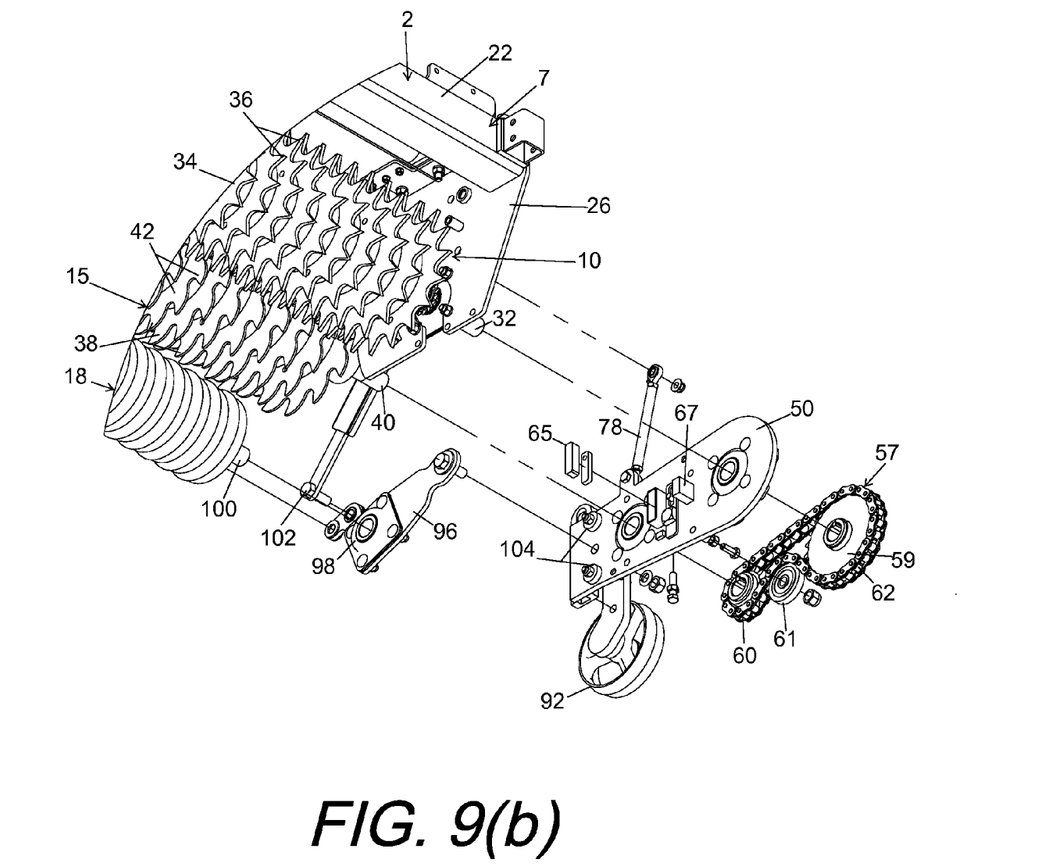

Referring to FIGS. 9(a) and 9(b), the illustrated drive rotor 10 is formed by an elongated drive rotor shaft 32 having a plurality of toothed drive rotor plates 34 secured in axially spaced relation therealong. As illustrated, teeth 36 of the drive rotor plates 34 are angularly staggered in a helical fashion to more evenly distribute the points of contact with the ground. The illustrated tillage rotor 15 is formed in a manner similar to the drive rotor 10 and has a plurality of toothed tillage rotor plates 38 secured in axially spaced relation along a tillage rotor shaft 40, teeth 42 of the tillage rotor plates 38 being angularly staggered in a helical manner to evenly distribute the points of contact of the teeth 42 with the ground. In the illustrated apparatus 1, the tillage rotor plates 38 have the same spacing along the tillage rotor shaft 40 as the drive rotor plates 34 along the drive rotor shaft 32. The drive rotor 10 is mounted transverse to the support frame 7 by extension of ends of the drive rotor shaft 32 through drive rotor bearing blocks 46 (FIG. 8) secured to the side walls 26.

The tillage assembly 12 including the tillage rotor 15 and the firming roller 18 is pivotally connected to the support frame 7 by bearing plates 50. The bearing plates 50 have bearing plate bearing blocks 52 which receive ends of the drive rotor shaft 32 therethrough to pivotally connect the tillage assembly 12 to the support frame 7 by pivoting the tillage assembly 12 about the drive rotor shaft 32. The bearing plates 50 have tillage rotor bearing blocks 55 mounted thereon which receive ends of the tillage rotor shaft 40. The drive rotor shaft 32 is drivingly engaged with the tillage rotor shaft 40 by a drive mechanism 57 (FIGS. 8 and 9). In the illustrated apparatus 1, the drive mechanism 57 is a chain drive mechanism including a drive sprocket 59, a tillage sprocket 60, an idler sprocket 61, and a roller drive chain 62. The illustrated drive sprocket 59 has twice the diameter of the tillage sprocket 60 so that the tillage rotor 15 rotates at twice the rotational speed of the drive rotor 10. It is foreseen that other types of drive transfer mechanisms could be employed between the drive rotor 10 and the tillage rotor 15 and that other drive ratios could be employed.

In the illustrated apparatus 1, the tillage rotor 15 is mounted in such spaced relation to the drive rotor 10 that the tillage rotor plates 38 are meshed between the drive rotor plates 34. Cylinders defined by the tillage rotor teeth 40 and the drive rotor teeth 36 intersect one another so that respective peripheries of the plates 38 and 34 extend past one another. The tillage rotor plates 38 are positioned on the tillage rotor shaft 40 so that they are centered between adjacent drive rotor plates 34. The meshing of the plates 34 and 38 tends to prevent clogging of plant materials and rocks between the rotors 10 and 15. The tillage rotor 15 is maintained in a proper lateral alignment with the drive rotor 10 by thrust bearings 65 which are mounted in on inside surfaces of the bearing plates 50 and which engage the side walls 26. The thrust bearings 65 are adjustable to maintain lateral alignment of the drive and tillage rotors 10 and 15 as wear of the thrust bearings 65 occurs. It is important to maintain the tillage rotor plates 38 centered between the drive rotor plates 34 to avoid damaging engagement of the plates 38 and 34 and also to maintain alignment of the drive and tillage sprockets 59 and 60. Angular movement of the tillage assembly 12 relative to the support frame 7 is limited by stop blocks 67 mounted on inside surfaces of the bearing plates 50 which engage curved stop slots 69 formed in the side walls 26 of the support frame 7.

Figure 10:
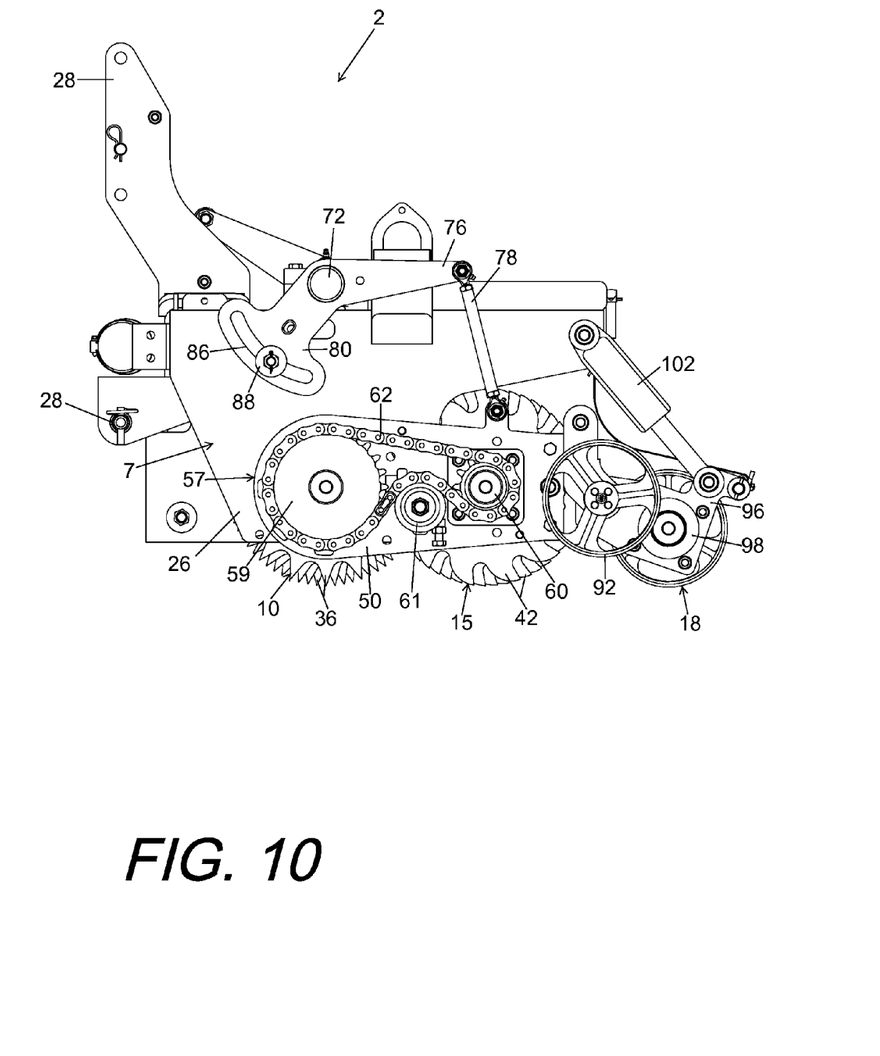
FIG. 10 is an enlarged side elevational view of the lower tillage unit of the apparatus.

It is also necessary to maintain a parallel relation between the drive rotor 10 and the tillage rotor 15. In the illustrated apparatus 1, a tillage rotor alignment mechanism 70 (FIGS. 6 and 7) includes a rockshaft 72 mounted on the support frame 7 to pivot about its longitudinal axis. Bell cranks 74 are mounted at each end of the rockshaft 72. A rear arm 76 of each crank 74 is pivotally connected to one of the bearing plates 50 by a rockshaft link 78. A front arm 80 of one of the cranks 74 can be pivotally connected to the side wall 26 by a biasing member 82. In the illustrated apparatus 1, the front arm 84 of the other crank 74 is provided with a curved slot 86 (FIG. 10) which engages a guide pin 88 extending from the side wall 26. It is foreseen that both front arms 80 and 84 could be connected by biasing members 82 to the support frame 7. The biasing member 82 is employed to provide a downward force on the tillage rotor 15 to control, to some extent, the penetration of the tillage rotor plates 38 into the soil. The illustrated biasing member 82 is referred to as an air shock and provides a biasing force on the tillage rotor 15 which can be adjusted by injecting compressed air at a selected pressure. The air shock could alternatively be replaced by a hydraulic shock absorber in combination with a coil spring or a similar mechanism. The biasing member 82 additionally absorbs shocks to the tillage rotor 15 from travel over uneven ground and prevents oscillation or bouncing of the tillage rotor 15 in response to such shocks. Ground penetration of the tillage rotor plates 38 is further controlled by gauge wheels 92 which are mounted on the rear ends of the bearing plates 50. Mountings for the gauge wheels 92 are adjustable to control tillage depth. The gauge wheels 92 roll along the ground surface and limit penetration of the tillage rotor plates 38.

The firming roller 18 is rotatably mounted on firming roller mounting plates 96 which are pivotally connected to the rear ends of the bearing plates and which have firming roller bearing blocks 98 which receive end shafts 100 of the firming roller 18. The plates 96 are pivotally connected to telescoping limit links 102 which are then pivotally connected to the side walls 26 of the support frame 7. The firming roller 18 is allowed to float to follow the ground contour; however, movement of the ends of the firming roller 18 is controlled by the limit links 102. Movement of the ends of the firming roller 18 is further limited by contact of the mounting plates 96 with upper and lower firming roller stops 104 positioned in the inner surfaces of the bearing plates 50. The firming roller 18 provides further break-up of clods of soil and firms up the seed bed to promote seed germination.

Figure 1:
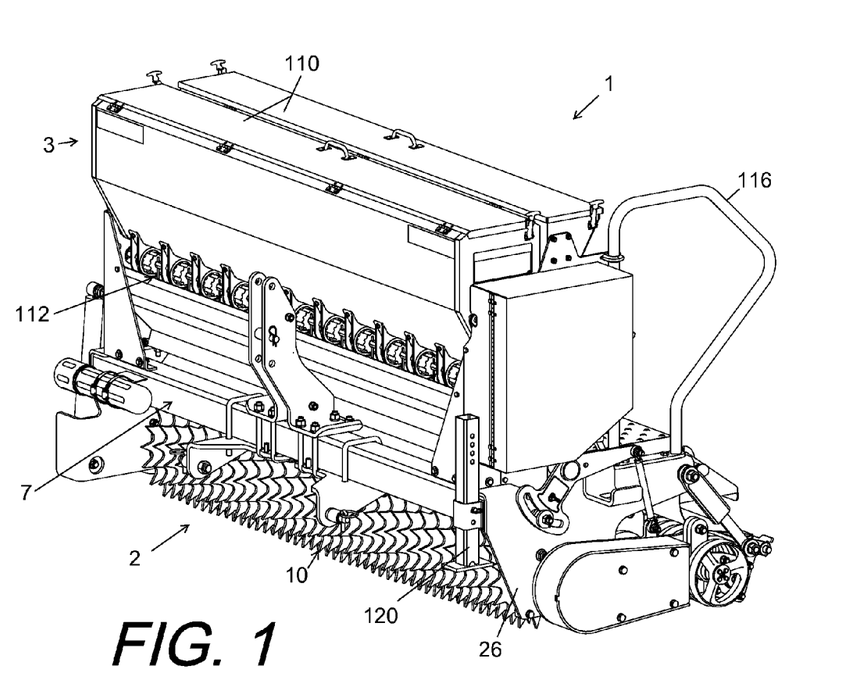
FIG. 1 is a perspective view of an embodiment of a single pass ground driven tiller and seeder apparatus according to the present invention, viewed from a left front position.
Figure 2:
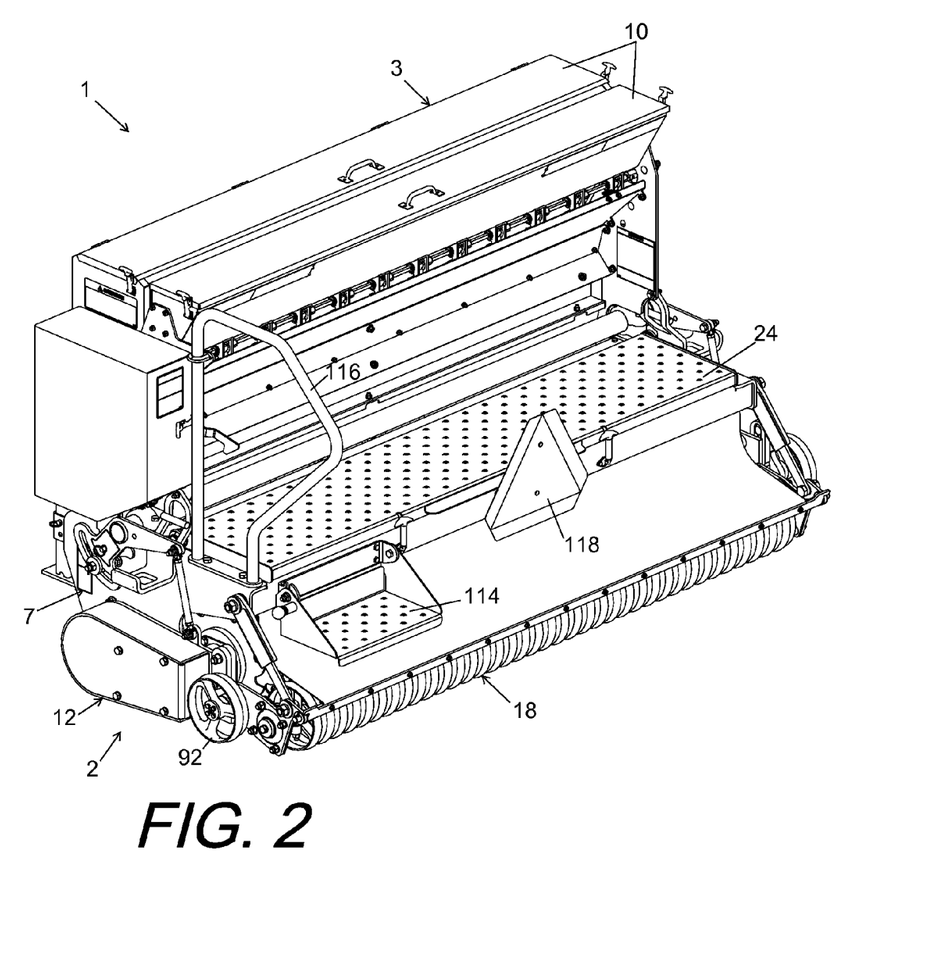
FIG. 2 is a perspective view of the apparatus viewed from a left rear position.
Figure 3:
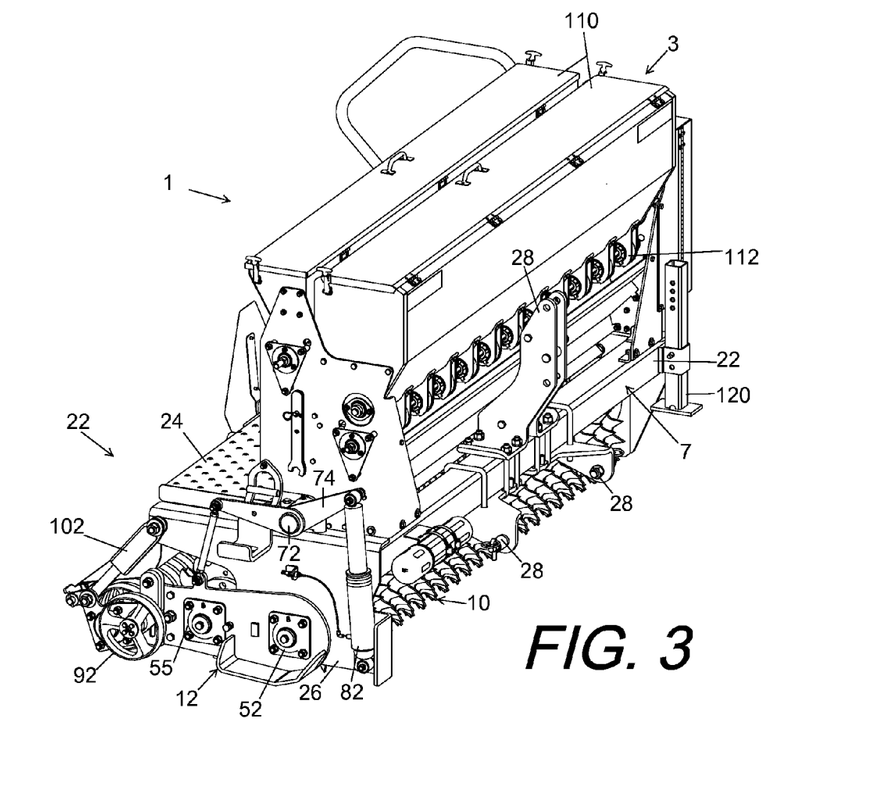
FIG. 3 is a perspective view of the apparatus viewed from a right front position.
Figure 4:
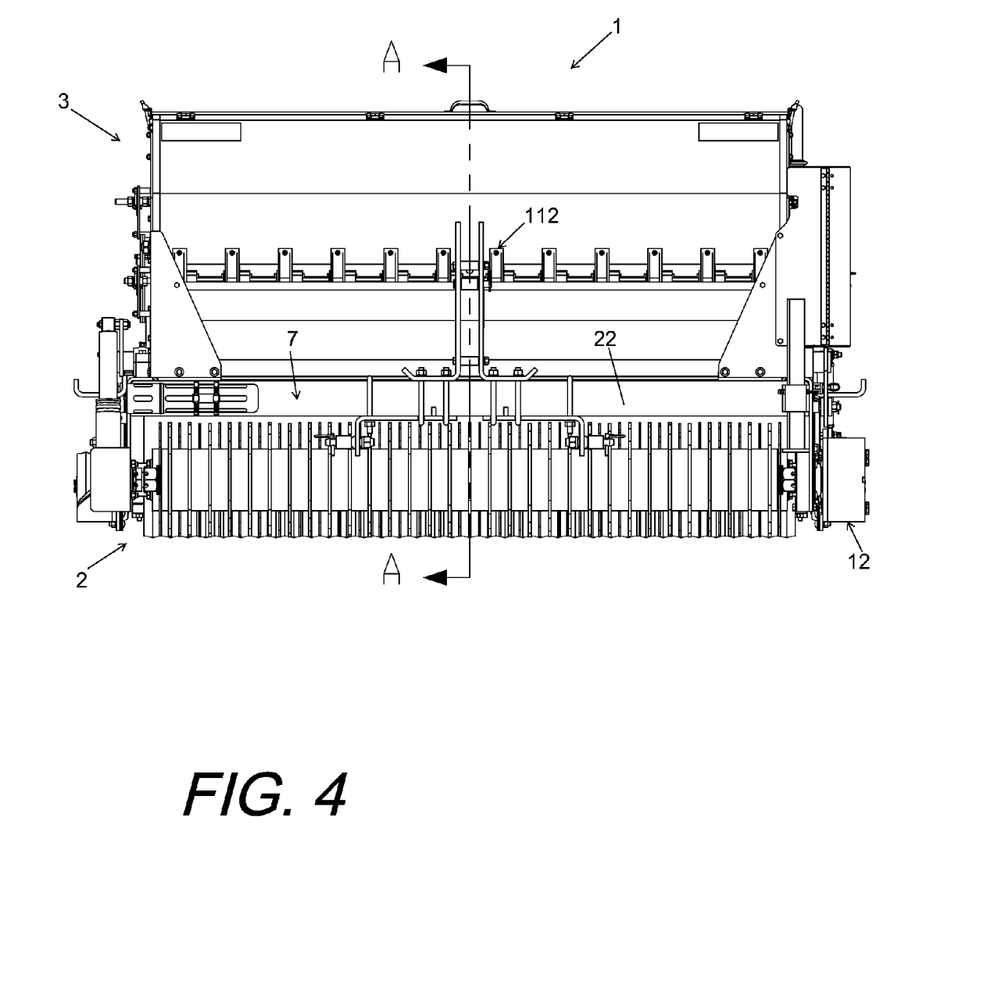
FIG. 4 is a front elevational view of the apparatus.
Figure 5:
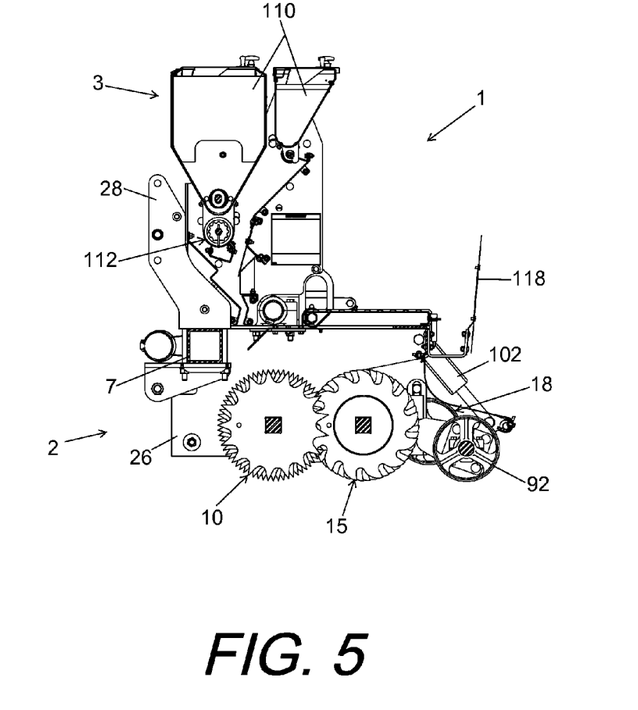
FIG. 5 is a longitudinal sectional view of the apparatus taken on line A-A of FIG. 4 and illustrates internal details of the apparatus.
Figure 6:
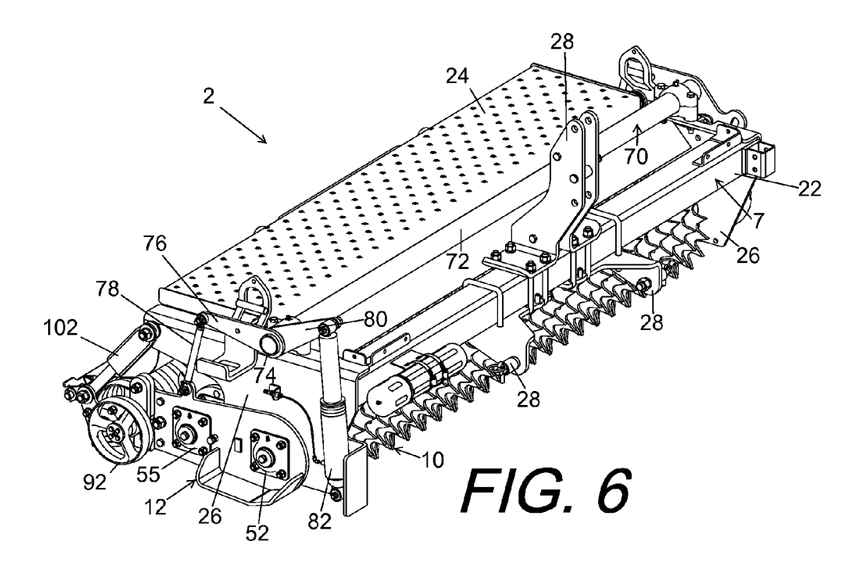
FIG. 6 is perspective view of a lower tillage unit of the tiller and seeder apparatus viewed from a right front position.
Figure 7:
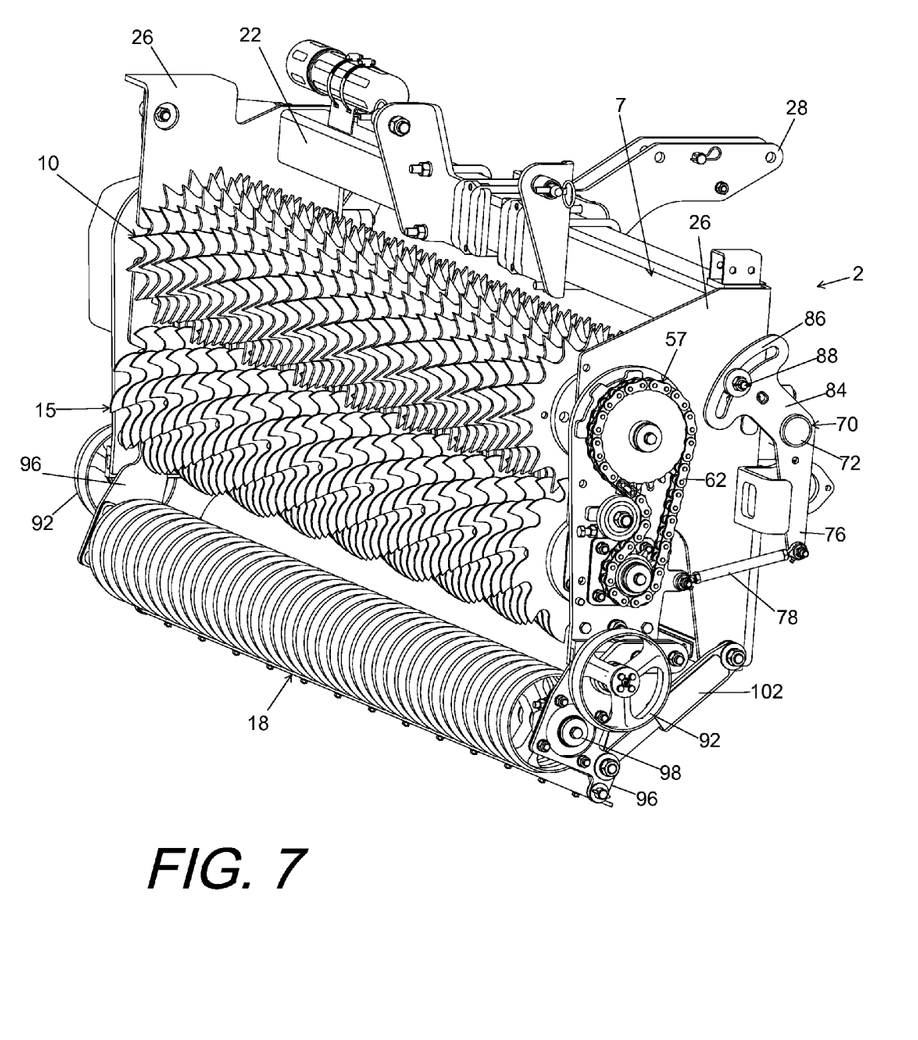
FIG. 7 is a perspective view of the tillage unit from a left front position below the unit.

Referring to FIGS. 1-3, the seed metering unit 3 includes one or more seedboxes 110 which store a quantity of seed to be planted and a seed metering mechanism 112 which receives seed from the seedboxes 110 and dispenses the seed at a controlled rate. The seed metering mechanism 112 can be driven from the drive rotor 10 by a drive transfer mechanism (not shown) or by a separate motor. On the illustrated apparatus 1, the top platform 24 can serve as a standing platform for access to the seedboxes 110 to replenish the seed therein. Preferably, the platform 24 is hinged to provide access to the rotors 10 and 15 for inspection or for clearing debris therefrom. During tillage operations, the closed platform 24 keeps soil and debris within the apparatus 1. The apparatus 1 may also include a step 114 and a hand rail 116 to facilitate access to the seedboxes 110. The apparatus 1 may also be provided with visual safety equipment, such a reflective triangle 118 for greater visibility when the apparatus 1 is carried by a tractor on roads. The apparatus 1 may be provided with a parking stand formed by one or more extendible feet 120 (FIG. 1) to stabilize the apparatus 1 when it is disconnected from the tractor.

It is to be understood that while certain forms of the present invention have been illustrated and described herein, it is not to be limited to the specific forms or arrangement of parts described and shown.

Having thus described the invention, what is claimed as new and desired to be secured by Letters Patent is:

1. A tiller apparatus comprising:
   (a) a support frame;
   (b) a drive rotor rotatably mounted on said support frame to enable rotation about a transverse drive rotor axis, said drive rotor being rotated by ground contact during movement of said apparatus along the ground;
   (c) a tillage assembly pivotally connected to said support frame, said tillage assembly including a tillage rotor rotatably mounted thereon and having a tillage rotor axis oriented in substantially parallel relation to said drive rotor axis;
   (d) a drive mechanism engaged between said drive rotor and said tillage rotor and causing rotation of said tillage rotor in response to rotation of said drive rotor to thereby till soil contacted thereby during said movement of said apparatus along said ground;
   (e) a tillage rotor alignment mechanism engaged between said support frame and said tillage assembly to maintain a parallel relation of said tillage rotor axis with said drive rotor axis;
   (f) a biasing member engaged between said tillage rotor alignment mechanism and said tillage assembly and exerting a downward force on said tillage assembly to thereby maintain contact between said tillage rotor and the ground;
   (g) wherein said biasing member comprises an air shock capable of being adjusted by altering compressed air pressure within said biasing member; and
   (h) wherein said tillage assembly pivots against said support frame in order to maintain contact between said tillage rotor and the ground.

2. An apparatus as set forth in claim 1 wherein said tillage rotor alignment mechanism includes:
   (a) an elongated rockshaft pivotally mounted on said support frame to pivot about a longitudinal rockshaft axis, said rockshaft extending across said support frame; and
   (b) said rockshaft being linked to said tillage assembly to thereby maintain a parallel relation between said tillage rotor axis and said drive rotor axis.

3. An apparatus as set forth in claim 1 and including:
   (a) a gauge wheel rotatably mounted on said tillage assembly and limiting a depth of tillage of said tillage rotor.

4. An apparatus as set forth in claim 1 wherein:
(a) said tillage assembly includes a firming roller rotatably mounted thereon and firming soil tilled by said tillage rotor.

5. An apparatus as set forth in claim 1 wherein:
(a) said drive rotor includes an elongated drive rotor shaft having a plurality of toothed drive rotor plates positioned thereon in axially spaced relation; and
(b) said tillage rotor includes an elongated tillage rotor having a plurality of toothed tillage plates positioned thereon in axially spaced relation.

6. An apparatus as set forth in claim 5 wherein:
(a) said tillage rotor is axially positioned relative to said drive rotor such that said tillage rotor plates are positioned in planes substantially centered between respective ones of said drive rotor plates.

7. An apparatus as set forth in claim 6 wherein:
(a) respective peripheries of said tillage rotor plates and said drive rotor plates extend past one another to a selected extent whereby said tillage rotor plates and said drive rotor plates are enmeshed.

8. An apparatus as set forth in claim 1 and including:
(a) a seed metering unit mounted on said support frame and operative to dispense seeds at a selected rate as said apparatus is moved along said ground.

9. A tiller apparatus comprising:
(a) a support frame having opposite lateral sides;
(b) an elongated drive rotor rotatably mounted on said support frame to enable rotation about a transverse drive axis, said drive rotor being rotated by ground contact during movement of said apparatus along the ground;
(c) a tillage assembly pivotally connected to said support frame, said tillage assembly including a pair of bearing plates pivotally connected respectively to said sides of said support frame and an elongated tillage rotor having a tillage rotor axis rotatably connected to said bearing plates and extending therebetween, said tillage rotor axis being oriented in substantially parallel relation to said drive rotor axis;
(d) a drive mechanism engaged between said drive rotor and said tillage rotor and causing rotation of said tillage rotor in response to rotation of said drive rotor to thereby till soil contacted thereby during said movement of said apparatus along said ground; and
(e) a tillage rotor alignment mechanism engaged between said support frame and said tillage assembly to maintain a parallel relation of said tillage rotor axis with said drive rotor axis;
(f) a biasing member engaged between said tillage rotor alignment mechanism and said tillage assembly and exerting a downward force on said tillage assembly to thereby maintain contact between said tillage rotor and the ground;
(g) an elongated rockshaft pivotally mounted on said support frame to pivot about a longitudinal rockshaft axis, said rockshaft extending across said support frame;
(h) said rockshaft being linked to said tillage assembly to thereby maintain a parallel relation between said tillage rotor axis and said drive rotor axis;
(i) wherein said biasing member comprises an air shock capable of being adjusted by altering compressed air pressure within said biasing member; and
(j) wherein said tillage assembly pivots against said support frame in order to maintain contact between said tillage rotor and the ground.

10. An apparatus as set forth in claim 9 and including:
(a) a biasing member engaged between said tillage rotor alignment mechanism and said tillage assembly and exerting a downward force on said tillage assembly to thereby control a depth of tillage of said tillage rotor.

11. An apparatus as set forth in claim 9 and including:
(a) a gauge wheel rotatably mounted on said tillage assembly and limiting a depth of tillage of said tillage rotor.

12. An apparatus as set forth in claim 9 and including:
(a) a firming roller rotatably mounted on said tillage assembly in spaced relation to said tillage rotor and firming soil tilled by said tillage rotor.

13. An apparatus as set forth in claim 9 wherein:
(a) said drive rotor includes an elongated drive rotor shaft having a plurality of toothed drive rotor plates positioned thereon in axially spaced relation; and
(b) said tillage rotor includes an elongated tillage rotor having a plurality of toothed tillage plates positioned thereon in axially spaced relation.

14. An apparatus as set forth in claim 13 wherein:
(a) said tillage rotor is axially positioned relative to said drive rotor such that said tillage rotor plates are positioned in planes substantially centered between respective ones of said drive rotor plates.

15. An apparatus as set forth in claim 14 wherein:
(a) respective peripheries of said tillage rotor plates and said drive rotor plates extend past one another to a selected extent whereby said tillage rotor plates and said drive rotor plates are enmeshed.

16. An apparatus as set forth in claim 9 and including:
(a) a seed metering unit mounted on said support frame and operative to dispense seeds at a selected rate as said apparatus is moved along said ground.

17. A tiller apparatus comprising:
(a) a support frame having opposite lateral sides;
(b) an elongated drive rotor rotatably mounted on said support frame to enable rotation about a transverse drive axis, said drive rotor being rotated by ground contact during movement of said apparatus along the ground;
(c) said drive rotor including an elongated drive rotor shaft having a plurality of toothed drive rotor plates positioned thereon in axially spaced relation;
(d) a tillage assembly pivotally connected to said support frame, said tillage assembly including a pair of bearing plates pivotally connected respectively to said sides of said support frame and an elongated tillage rotor having a tillage rotor axis rotatably connected to said bearing plates and extending therebetween, said tillage rotor axis being oriented in substantially parallel relation to said drive rotor axis;
(e) said tillage rotor including an elongated tillage rotor having a plurality of toothed tillage plates positioned thereon in axially spaced relation;
(f) a drive mechanism engaged between said drive rotor and said tillage rotor and causing rotation of said tillage rotor in response to rotation of said drive rotor to thereby till soil contacted thereby during said movement of said apparatus along said ground;
(g) a tillage rotor alignment mechanism engaged between said support frame and said tillage assembly to maintain a parallel relation of said tillage rotor axis with said drive rotor axis;
(h) a biasing member engaged between said tillage rotor alignment mechanism and said tillage assembly and exerting a downward force on said tillage assembly to thereby maintain contact between said tillage rotor and the ground;

(i) a firming roller rotatably mounted on said tillage assembly in spaced relation to said tillage rotor and firming soil tilled by said tillage rotor; and (j) a gauge wheel rotatably mounted on said tillage assembly and limiting a depth of tillage of said tillage rotor;

(k) wherein said biasing member comprises an adjustable air shock, the air shock being adjustable by altering compressed air pressure within said air shock; and (l) wherein said tillage assembly pivots against said support frame in order to maintain contact between said tillage rotor and the ground.

18. An apparatus as set forth in claim 17 wherein said tillage rotor alignment mechanism includes:

(a) an elongated rockshaft mounted on said support frame to pivot about a longitudinal rockshaft axis, said rockshaft extending across said support frame; and (b) end crank arms linking said rockshaft to said tillage assembly to thereby maintain a parallel relation between said tillage rotor axis and said drive rotor axis.

19. An apparatus as set forth in claim 17 wherein:

(a) said tillage rotor is axially positioned relative to said drive rotor such that said tillage rotor plates are positioned in planes substantially centered between respective ones of said drive rotor plates.

20. An apparatus as set forth in claim 18 wherein:

(a) respective peripheries of said tillage rotor plates and said drive rotor plates extend past one another to a selected extent whereby said tillage rotor plates and said drive rotor plates are enmeshed.

21. An apparatus as set forth in claim 17 and including:

(a) a seed metering unit mounted on said support frame and operative to dispense seeds at a selected rate as said apparatus is moved along said ground.

* * * * *